(12) United States Patent
Dann et al.

(10) Patent No.: US 11,354,771 B1
(45) Date of Patent: Jun. 7, 2022

(54) SIMULATION ENVIRONMENT FOR EFFICIENT ASSESSMENT OF MEMORY-BOUND PLATFORMS

(71) Applicant: SAP SE, Walldorf (DE)

(72) Inventors: Jonas Dann, Heidelberg (DE); Daniel Ritter, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/337,567

(22) Filed: Jun. 3, 2021

(51) Int. Cl.
  *G06T 1/20* (2006.01)
  *G06T 1/60* (2006.01)

(52) U.S. Cl.
  CPC . *G06T 1/60* (2013.01); *G06T 1/20* (2013.01)

(58) Field of Classification Search
  CPC .. G06T 1/20; G06T 1/60; G06T 7/162; G06T 11/206
  USPC ................................................. 345/501, 530
  See application file for complete search history.

(56) References Cited

U.S. PATENT DOCUMENTS

| | | | |
|---|---|---|---|
| 11,205,125 B2* | 12/2021 | Datta | G06N 3/10 |
| 2019/0004955 A1* | 1/2019 | Adler | G06F 15/7867 |
| 2021/0097221 A1* | 4/2021 | Liao | G06F 9/544 |
| 2022/0019545 A1* | 1/2022 | Bertacco | G06F 3/0655 |

\* cited by examiner

*Primary Examiner* — Jacinta M Crawford
(74) *Attorney, Agent, or Firm* — Fish & Richardson P.C.

(57) ABSTRACT

Methods, systems, and computer-readable storage media for providing a simulated graph processing accelerator representative of a hardware-based graph processing accelerator, the simulated graph processing accelerator including a controller component, a set of producer components, and a final merge component; triggering execution of the simulated graph processing accelerator as a simulation of processing of a graph for one or more of breadth-first search (BFS), single source shortest path (SSSP), weakly connected components (WCC), sparse matrix-vector multiplication (SpMV), and PageRank (PR), execution including: generating request streams from each producer component, merging request streams to provide a merged request stream, inputting the merged request stream to a memory simulator, and processing, by the memory simulator, the merged request stream to simulate handling of requests in memory.

20 Claims, 12 Drawing Sheets

SIMULATION ENVIRONMENT FOR EFFICIENT ASSESSMENT OF MEMORY-BOUND PLATFORMS

BACKGROUND

Continued advancement in technology, enterprise operations, and society have required revisiting of the design and implementation of a broad variety of multi-model algorithms (e.g. graph, spatial, Javascript object notation (JSON) documents, extensible markup language (XML) documents). This implies the design of algorithms for memory-bound problems, such as graph processing, on multiple, disparate hardware platforms (e.g., accelerator hardware) and selecting the appropriate memory technology.

In an example context, an increasing trend in many areas of computer science (e.g., machine learning (ML), computational sciences, medical applications, social network analysis) is the representation, storage, and processing of structured data as graphs. For example, structured data can be represented as a graph that includes vertices (nodes) and edges between vertices, a vertex representing an entity and an edge representing a relationship between entities. Consequently, graph processing has gained relevance in the fields of non-relational databases and analytics platforms.

Graph processing can include performance problems on traditional hardware (e.g., central processing units (CPUs), graphics processing units (GPUs)), which can result from irregular memory accesses and little computational intensity inherent in graph processing. In view of this, FPGA accelerators have been implemented to enable unique memory access patterns and control flow optimizations. FPGAs, as compared to CPUs or GPUs (which have fixed memory hierarchies), have custom-usable on-chip memory and logic resources that are not constrained to a predefined architecture. While FPGA-based graph processing accelerators show good results for acceleration of irregular memory access patterns, programming FPGAs is time-consuming and difficult as compared to CPUs and GPUs, where the software stack is much better developed. Additionally, most software developers lack the skill set needed for high-performance FPGA programming, making development even more cumbersome. Further, there are deficiencies in benchmarking of graph processing accelerators due to the relatively large number of FPGAs on the market and lack of accepted benchmark standards.

SUMMARY

Implementations of the present disclosure are directed to a simulation environment for efficient assessment of memory-bound platforms. More particularly, implementations of the present disclosure are directed to a simulation environment for the analysis of graph processing accelerators by simulating memory access patterns. As described in further detail herein, implementations of the present disclosure obviate implementing a cycle-accurate internal data flow on hardware platforms (e.g., graph processing accelerator hardware provided as field-programable arrays (FPGAs)) to significantly reduce implementation time, increase benchmark parameter transparency, and enable comparison of graph processing approaches.

In some implementations, actions include providing a first simulated graph processing accelerator representative of a hardware-based graph processing accelerator, the first simulated graph processing accelerator including: a controller component that is configured to trigger iterations of processing of a graph including a set of vertices and a set of edges and selectively cease processing of the graph, a set of producer components, each producer component configured to, for each iteration, turn control flow triggers into a request stream comprising a set of requests to memory, and a final merge component that is configured to directly merge request streams of producer components; triggering execution of the first simulated graph processing accelerator as a simulation of processing of a graph for one or more of breadth-first search (BFS), single source shortest path (SSSP), weakly connected components (WCC), sparse matrix-vector multiplication (SpMV), and PageRank (PR), execution including: generating request streams from each producer component, merging request streams using the final merge component to provide a merged request stream, inputting the merged request stream to a memory simulator, and processing, by the memory simulator, the merged request stream to simulate handling of requests in memory; and providing, in response to ceasing execution of the first simulated graph processing accelerator, output including a runtime for processing of the graph by the first simulated graph processing accelerator. Other implementations of this aspect include corresponding systems, apparatus, and computer programs, configured to perform the actions of the methods, encoded on computer storage devices.

These and other implementations can each optionally include one or more of the following features: the simulation includes edge-centric graph processing of the graph; the controller component is further configured to execute iterations of the edge-centric graph processing until there are no changes to vertex values from a previous iteration, and to, for each iteration, schedule all partitions for a scatter phase of the edge-centric graph processing before scheduling all partitions to a gather phase of the edge-centric graph processing; the simulation includes vertex-centric graph processing of the graph; actions further include providing a second simulated graph processing accelerator representative of one or more optimizations applied to the hardware-based graph processing accelerator, and triggering execution of the first simulated graph processing accelerator as a simulation of processing of a graph; the set of requests includes read requests and write requests; and the memory simulator includes a computer-executable program that simulates dynamic random access memory (DRAM).

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to a simulation environment for efficient assessment of memory-bound platforms. More particularly, implementations of the present disclosure are directed to a simulation environment for the analysis of graph processing accelerators by simulating memory access patterns. As described in further detail herein, implementations of the present disclosure obviate implementing a cycle-accurate internal data flow on hardware platforms (e.g., graph processing accelerator hardware provided as field programable gate arrays (FPGAs)) to significantly reduce implementation time, increase benchmark parameter transparency, and enable easy reproduction and comparison of graph processing approaches.

Implementations can include actions of providing a simulated graph processing accelerator representative of a hardware-based graph processing accelerator, the first simulated graph processing accelerator including: a controller component that is configured to trigger iterations of processing of a graph including a set of vertices and a set of edges and selectively cease processing of the graph, a set of producer components, each producer component configured to, for each iteration, turn control flow triggers into a request stream comprising a set of requests to memory, and a final merge component that is configured to directly merge request streams of producer components; triggering execution of the simulated graph processing accelerator as a simulation of processing of a graph for one or more of breadth-first search (BFS), single source shortest path (SSSP), weakly connected components (WCC), sparse matrix-vector multiplication (SpMV), and PageRank (PR), execution including: generating request streams from each producer component, merging request streams using the final merge component to provide a merged request stream, inputting the merged request stream to a memory simulator, and processing, by the memory simulator, the merged request stream to simulate handling of requests in memory; and providing, in response to ceasing execution of the simulated graph processing accelerator, output including a runtime for processing of the graph by the simulated graph processing accelerator.

Figure 1:
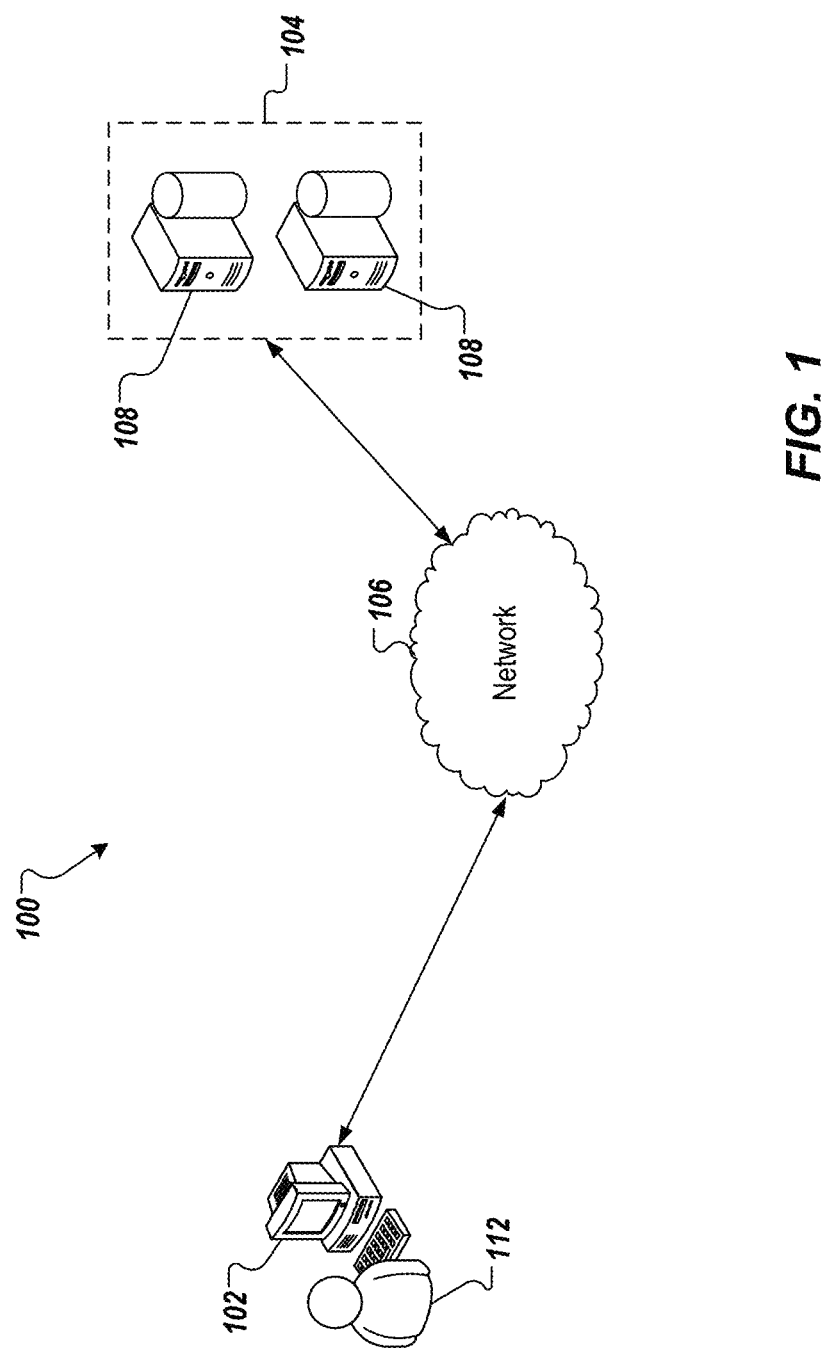
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106). In accordance with implementations of the present disclosure, the server system 104 can host a simulation environment for efficient assessment of memory-bound platforms, as described in further detail herein.

Implementations of the present disclosure are described in further detail herein with reference to an example hardware platform that includes one or more FPGAs. It is contemplated, however, that implementations of the present disclosure can be realized for any appropriate hardware platform. Example hardware platforms can include, without limitation, multi-central processing unit (CPU) platforms (e.g., multiple CPUs, system random access memory (RAM) (SysRAM), network interface card (NIC)), socket platforms (e.g., CPU, field-programmable array (FPGA), SysRAM, NIC)), near-data platforms (e.g., CPU, FPGA, SysRAM, disk-based memory), SmartNIC platforms (e.g., FPGA, ferroelectric RAM (FRAM), NIC, offload platforms (e.g., CPU, FPGA, FRAM, SysRAM, NIC), and graphics processing unit (GPU)-based platforms (e.g., CPU, GPU, graphics RAM (GRAM), SysRAM, NIC). For example, a hardware platform can be selected based on a task (e.g., data access, operator, communication layer, full node) to be performed by the hardware platform, as well as characteristics and sub-characteristics of respective tasks (e.g., parallelism (little, massive), boundness (compute, communication), queries (complex, simple), memory access (regular, irregular), etc.). Implementations of the present disclosure are also described herein with reference to an example use case, which includes graph processing accelerators. It is contemplated, however, that implementations of the present disclosure can be realized for any appropriate use case.

To provide further context for implementations of the present disclosure, and as introduced above, continued advancement in technology, enterprise operations, and society have required revisiting of the design and implementation of a broad variety of multi-model algorithms (e.g. graph, spatial, Javascript object notation (JSON) documents, extensible markup language (XML) documents). This implies the design of algorithms for memory-bound problems, such as graph processing, on multiple, disparate hardware platforms (e.g., accelerator hardware) and selecting the appropriate memory technology.

With regard to the example use case, an increasing trend in many areas of computer science (e.g., machine learning (ML), computational sciences, medical applications, social network analysis) is the representation, storage, and processing of structured data as graphs. For example, structured data can be represented as a graph that includes vertices (nodes) and edges between vertices, a vertex representing an entity and an edge representing a relationship between entities. Consequently, graph processing has gained relevance in the fields of non-relational databases and analytics platforms.

However, graph processing can include performance problems on traditional hardware (e.g., CPUs, GPUs), which can result from irregular memory accesses and little computational intensity inherent to graph processing. In view of this, FPGA accelerators have been implemented to enable unique memory access patterns and control flow optimizations. FPGAs, as compared to CPUs or GPUs (which have fixed memory hierarchies), have custom-usable on-chip memory and logic resources that are not constrained to a predefined architecture.

Figure 2:
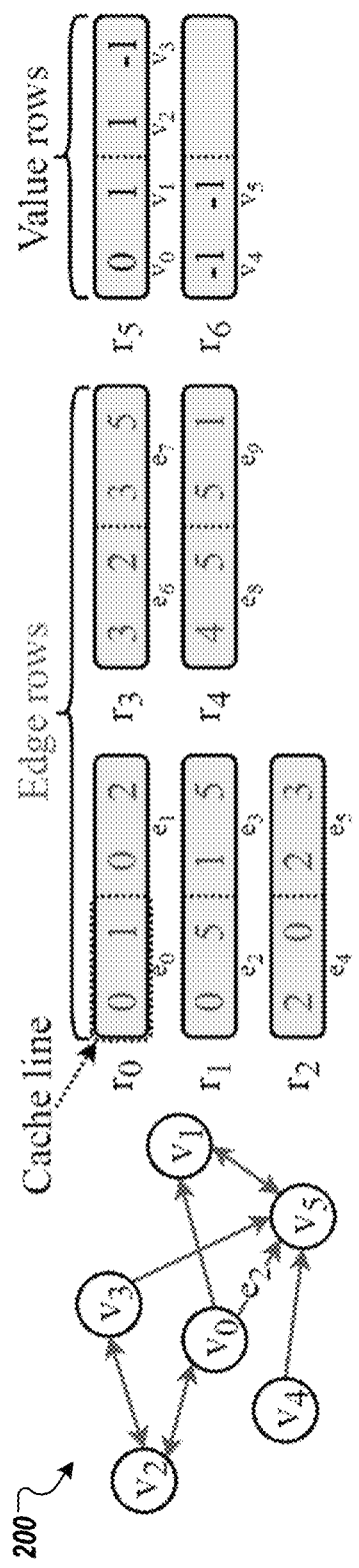
FIG. 2 depicts a conceptual illustration of irregular memory accesses for breadth-first search.

FIG. 2 depicts a conceptual illustration of irregular memory accesses for breadth-first search (BFS) of a graph 200 with a simplified representation in dynamic random-access memory (DRAM). More particularly, FIG. 2 illustrates the effect of irregular memory accesses for BFS with an edge-centric approach in processing the graph 200. When not reading sequentially from DRAM, bandwidth degrades quickly due to significant latency introduced by DRAM row switching and partially discarded fetched cache lines.

In further detail, the graph 200 includes vertices representing values (v) and edges (e) between vertices. In this example, each cache line consists of two values, the current BFS iteration is 1 with root $v_0$, and $e_2$ is the current edge to be processed. The edge array of the graph 200 is stored in rows $r_0$ to $r_4$ and the current value array is stored in rows $r_5$ and $r_6$. Reading begins with edge $e_2$, which incurs activating $r_1$ in the memory and reading a full cache line. Then, $r_5$ is activated and the first cache line containing $v_0$ and $v_1$ is read, but only $v_0$ is used. Finally, $r_6$ is activated to read $v_5$ and write the new value 1 to the same location, while wasting bandwidth of one value on each request (i.e., reading and not writing the value of $v_4$, respectively).

While FPGA-based graph processing accelerators show good results for reference of irregular memory access pattern acceleration, programming FPGAs is time-consuming and difficult as compared to CPUs and GPUs, where the software stack is much better developed. Additionally, most software developers lack the skill set needed for high-performance FPGA programming, making development even more cumbersome. Further, there are deficiencies in benchmarking of graph processing accelerators due to the relatively large number of FPGAs on the market (almost every article uses a different FPGA) and lack of accepted benchmark standards. This culminates in multiple challenges. A first challenge is the time-consuming and difficult development of accelerators for irregular memory access patterns of graph processing. A second challenge is that the differences in hardware platforms and benchmark setups hinder reproduction and comparison.

In view of the above context, implementations of the present disclosure provide a simulation environment for analyzing the performance of hardware platforms by simulating memory access patterns. With reference to the example hardware platform and use case introduced above, the simulation environment of the present disclosure enables time- and resource-efficient analysis of graph processing accelerators by simulating memory access patterns. As described in further detail herein, the simulation environment of the present disclosure embodies a methodology and tool to quickly reproduce and compare different approaches in a synthetic, fixed environment.

On a real FPGA, the on-chip logic implements data flow on on-chip (in block RAM (BRAM)) and off-chip state and graph data in the off-chip DRAM. Based on the observation that the access to DRAM is the dominating factor in graph processing, the simulation environment of the present disclosure implements an approximation of the off-chip memory access pattern by working on the graph and state independently of the concrete data flow on the FPGA, the approximation being fed into a DRAM simulator. While the performance reported by such a simulation may not perfectly match real performance measurements, the simulation provides a time- and resource-efficient means to analyze and understand different graph processing accelerators. As such, implementations of the present disclosure are premised on the following hypothesis: memory access patterns dominate the overall runtime of graph processing, such that disregarding the internal data flow results in a reasonable error in a simulation.

Figure 3:
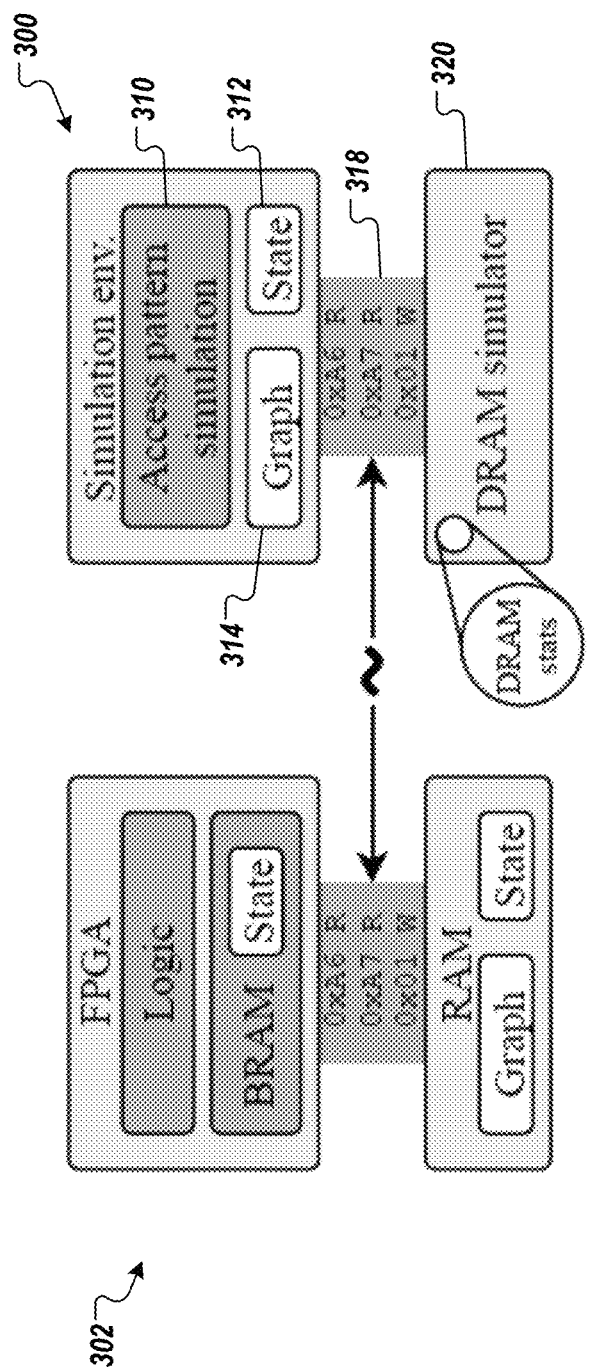
FIG. 3 depicts a conceptual representation of a graph processing memory simulation environment in accordance with implementations of the present disclosure.

FIG. 3 depicts a conceptual representation of a graph processing memory simulation environment 300 in accordance with implementations of the present disclosure. More particularly, FIG. 3 depicts a conceptual representation of the simulation environment 300 of the present disclosure in comparison to a FPGA-based graph processing environment 302 (i.e., hardware-based environment). In the example of FIG. 3, the simulation environment 300 includes an access pattern simulator 310, graph data 312, and state data 314. As described in further detail herein, the simulation environment simulates data access patterns 318 that are input to a DRAM simulator 320.

As described in further detail herein, the simulation approach of the present disclosure significantly reduces the time to test graph processing accelerators and enables design support and deeper inspection with DRAM statistics and relatively easy parameter variation.

Implementations of the present disclosure are described in further detail herein with reference to example graph processing accelerators, which include AccuGraph and HitGraph. The example graph processing accelerators were selected for reference among other graph processing accelerators (e.g., ForeGraph, ThunderGP) based on criteria, such as reported performance numbers on commodity hardware and sufficient conceptual details. Evaluation of implementations of the present disclosure are provided herein with non-limiting reference to AccuGraph and HitGraph. For this evaluation, a percentage error (e) can be determined based on a performance (s) of the simulation environment of the present disclosure and a groundtruth performance (t) for each graph processing accelerator. For example, the groundtruth performance for a graph processing accelerator can be determined by executing the graph processing accelerator in a hardware-based environment (e.g., the FPGA-based graph processing environment 302 of FIG. 3).

Figure 4:
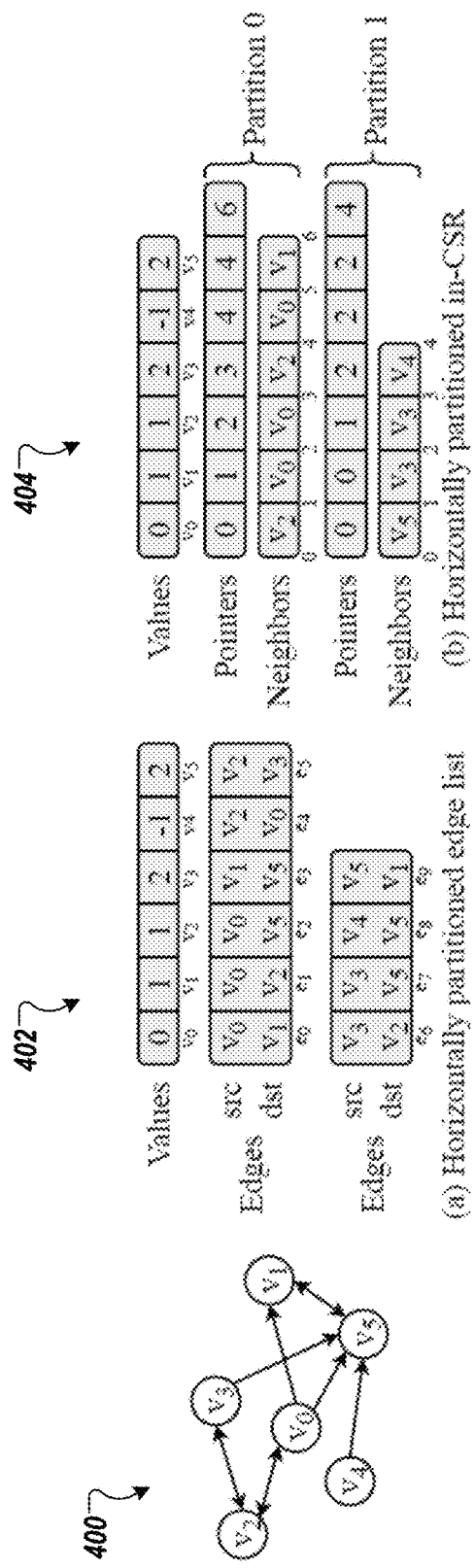
FIG. 4 depicts examples of graph partitioning and data structures.

With regard to graph processing, a graph can be defined as G=(V, E), where V is a set of vertices (or nodes) and E is a set of edges (E⊆V×V). Intuitively, and as introduced above, graphs are used to describe a set of entities (vertices) and their relations (edges). FIG. 4 depicts examples of graph partitioning and data structures for a graph 400. More particularly, FIG. 4 shows the graph 400 as a horizontally partitioned edge list 402 and as a horizontally partitioned compressed sparse row (CSR) format 404. The horizontally partitioned edge list 402 (used by HitGraph) stores the graph 400 as arrays of edges with a source and a destination vertex. For example, edge $e_0$ connects source $v_0$ to destination vertex $v_1$. The CSR format of the inverted edges (used by AccuGraph) means that all source and destination vertices of the edges in E are swapped before building a CSR data structure. CSR is a data structure for compressing sparse matrices (in this case the adjacency matrix of the graph 400) with two arrays. The values of the pointers array at position i and i+1 delimit the neighbors of $v_i$ stored in the neighbor's array. For example, for $v_5$ in partition 1, the neighbors are the values of the neighbor's array between 2 and 4 (i.e., $v_3$ and $v_4$).

Depending on the underlying graph data structure, graphs are processed based on two fundamentally different paradigms: edge- and vertex-centric graph processing. Edge-centric systems (e.g., HitGraph) iterate over the edges as primitives of the graph on an underlying edge list. Vertex-centric systems iterate over the vertices and their neighbors as primitives of the graph on underlying adjacency lists (e.g., CSR). Further, for the vertex-centric paradigm, there is a distinction into push- and pull-based data flow. A push-based data flow denotes that values are pushed along the forward direction of edges to update neighboring vertices. A pull-based data flow (e.g., applied by AccuGraph) denotes that values are pulled along the inverse direction of edges from neighboring vertices to update the current vertex.

In the context of the present disclosure, multiple graph problems implemented by HitGraph and AccuGraph are considered, which include: BFS, single source shortest path (SSSP), weakly connected components (WCC), sparse matrix-vector multiplication (SpMV), and PageRank (PR). The problems specify their implementations to varying degrees. For example, BFS denotes a sequence of visiting the vertices of a graph. Starting with a root vertex as the frontier, in each iteration, every unvisited neighbor of the current frontier vertex is marked as visited, assigned the current iteration as its value, and added to the frontier of the next iteration. In contrast, SSSP only specifies the desired output (i.e., for each vertex v∈V the shortest distance to the root vertex). The shortest distance equals the smallest sum of edge weights of any path from the root to v. If every edge is assumed to have weight 1, the result is equal to BFS. Similarly, WCC specifies as output for each vertex its affiliation to a weakly-connected component. Two vertices are in the same weakly-connected component, if there is an undirected path between them. There is no requirement on how these outputs are generated. SpMV and PR specify the execution directive. SpMV multiplies a vector (equal to V) with a matrix (equal to E) in iterations. PR is a measure to describe the importance of vertices in a graph and is calculated by recursively applying:

$$p(i) = \frac{1-d}{|V|} + \sum_{j \in N_G(i)} \frac{p(j)}{d_G(j)}$$

for each i∈V with damping factor d, neighbors $N_G$, and degree $d_G$.

Figure 5:
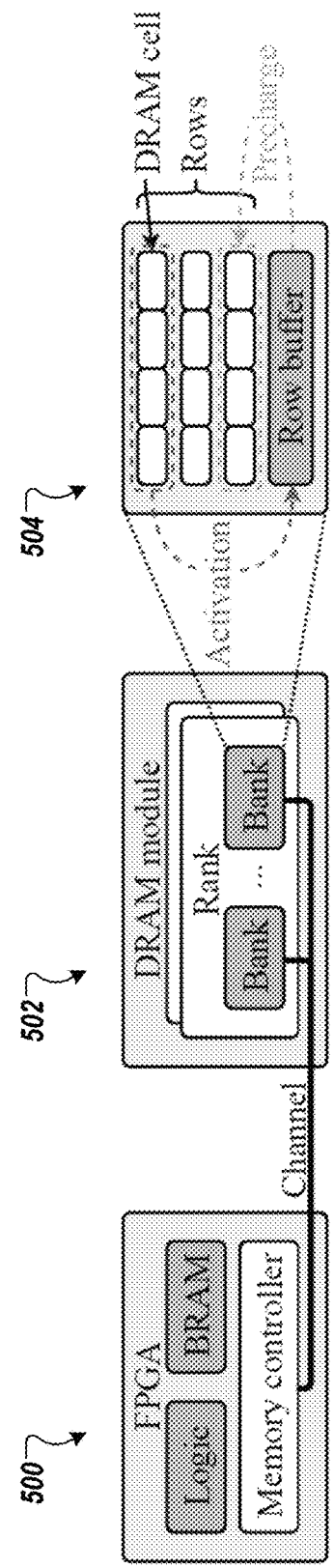
FIG. 5 depicts a representation of an internal organization of dynamic random-access memory (DRAM).

With reference to FIG. 5, as a processor architecture platform, FPGA chips map custom architecture designs (i.e., a set of logic gates and their connection) to a grid of resources (e.g., look-up tables, flip-flops, BRAM) connected with a programmable interconnection network. The memory hierarchy of FPGAs is split up into on-chip memory (e.g., in a FPGA 500) and off-chip memory (e.g., in a DRAM module 502). On-chip, FPGAs contain BRAM in the form of SRAM memory components. On modern FPGAs, there is about as much BRAM as there is cache on modern CPUs (all cache levels combined), but, and contrary to the fixed cache hierarchies of CPUs, BRAM is memory finely configurable to the application. For storage of larger data structures, the DRAM module 502 (e.g., DDR3, DDR4) is attached as off-chip memory.

In FIG. 5, and by way of non-limiting example, an internal organization 504 of DDR3 memory is depicted, which, at the lowest level, contains DRAM cells each representing one bit. The smallest number of DRAM cells (e.g., 16) that is addressable is called a column. Numerous columns (e.g., 1024) are grouped together into rows. Further, independently operating banks combine several thousand (e.g., 65,536) rows with a row buffer each.

Requests to data in a bank are served by the row buffer based on multiple scenarios. In a first scenario, when the addressed row is already buffered, the request is served with low latency (e.g., $t_{CL}$: 11 ns). In a second scenario, if the row buffer is empty, the addressed row is first activated (e.g., $t_{RCD}$: 11 ns), which loads it into the row buffer, and then the request is served. In a third scenario, if the row buffer currently contains a different row from a previous request, the current row has to be first pre-charged (e.g., $t_{RP}$: 11 ns), and only then can the addressed row be activated and the request served. Additionally, there is a minimum latency between switching rows (e.g., $t_{RAS}$: 28 ns). Thus, for high performance, row switching should be minimized.

Since one bank does not provide sufficient bandwidth, multiple parallel banks (e.g., 8) form a rank. Multiple ranks operate in parallel but on the same I/O pins, thus increasing capacity of the memory, but not bandwidth. The ranks of the memory are grouped into channels. Each channel has its own I/O pins to the FPGA, such that the bandwidth linearly increases with the number of channels. DDR4 contains another hierarchy level called bank groups, which group two to four banks to allow for more rapid processing of commands.

Figure 6:
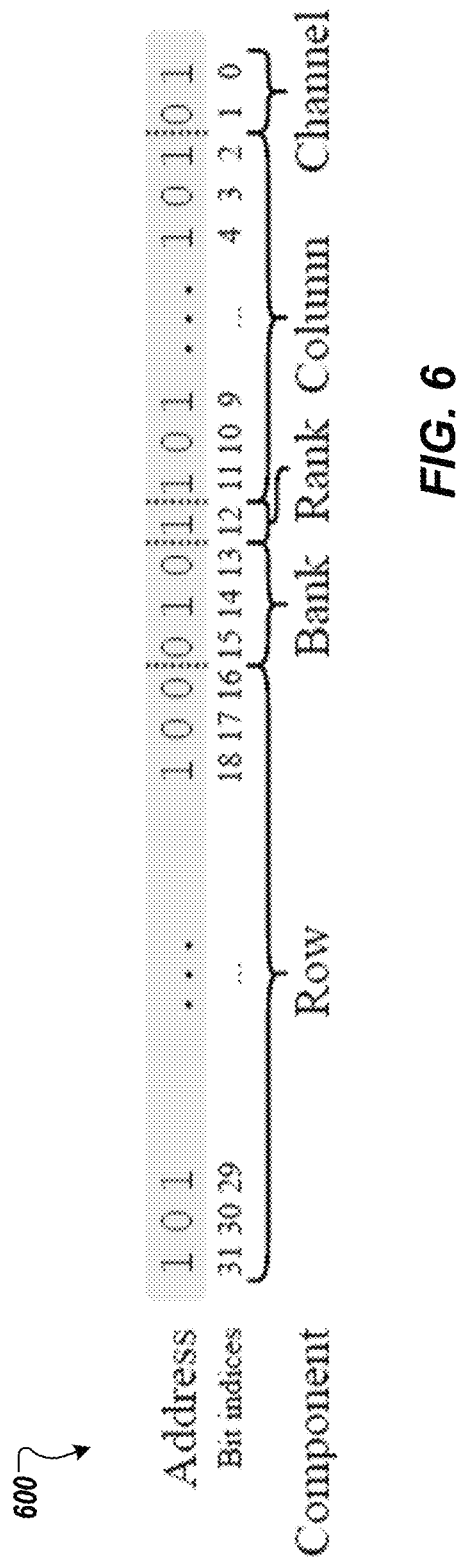
FIG. 6 depicts an example of DRAM addressing.

With reference to FIG. 6, data in DRAM is accessed by giving the memory a physical memory address 600 that is split up into multiple parts internally representing addresses for each component in the DRAM hierarchy. In view of this, different addressing schemes are possible. An example addressing scheme that aids distribution of requests over channels might first address the channels, meaning subsequent addresses go to different channels, then address columns, ranks, banks, and rows. To further improve memory bandwidth, modern DRAM returns multiple bursts of data for each request (also referred to as prefetching). For DDR3 and DDR4, each request returns a total of 64 Bytes over 8 cycles, which is referred to as a cache line herein.

To speed up the engineering of graph processing on FPGA accelerators, a DRAM simulator is provided in the simulation environment of the present disclosure (e.g., the DRAM simulator 320 of FIG. 3). In some implementations, the DRAM simulator supports DDR3 (e.g., for HitGraph) and DDR4 (e.g., for AccuGraph). An example DRAM simulator includes Ramulator, which is referred to in further detail herein without limiting implementations of the present disclosure. In general, it is understood that Ramulator, unlike other DRAM simulators (e.g., DRAMSim2, USIMM) supports both DDR3 and DDR4 standards among others (e.g., LPDDR3/4, HBM). Ramulator models DRAM as a tree of state machines (e.g., channel, rank, bank), where transitions are triggered by user commands or internal commands. However, Ramulator does not make any assumptions about data in memory. Purely the request and response flow is modelled with requests flowing into Ramulator and responses being called back. Ramulator configuration parameters include, without limitation, DRAM standard, channel count, rank count, DRAM speed specification, and DRAM organization.

As discussed herein, one of the challenges with evaluating new graph processing ideas on FPGAs is the time-consuming and difficult development of the graph processing accelerator. In view of this, the simulation environment of the present disclosure reduces development time and complexity and provides performance within a reasonable error when compared to performance measurements on hardware (e.g., the FPGA-based graph processing environment 302 of FIG. 3). To achieve this, implementations of the present disclosure relax the necessity of cycle-accurate simulation of on-chip data flow. This is in view of the above-introduced hypothesis: memory access patterns dominate the overall runtime of graph processing such that disregarding the internal data flow results in a reasonable error of a simulation. Modelling the off-chip memory access pattern means modelling request types, request addressing, request amount, and request ordering. Request type modelling is trivial, because it is readily discernible as to whether requests are either read data or write data. For request addressing, it is assumed that the different data structures (e.g., edge list, vertex values) are stored adjacently in memory as plain arrays. Accordingly, implementations of the present disclosure generate memory addresses according to this memory layout and the width of the array types in Bytes. Request amount modelling can be based on the size n of the vertex set, the size m of the edge set, average degree deg, and partition number p. The simulation environment of the present disclosure only simulates request ordering through mandatory control flow caused by data dependencies of requests. It can be assumed that computations and on-chip memory accesses are instantaneous by default.

Figure 7:
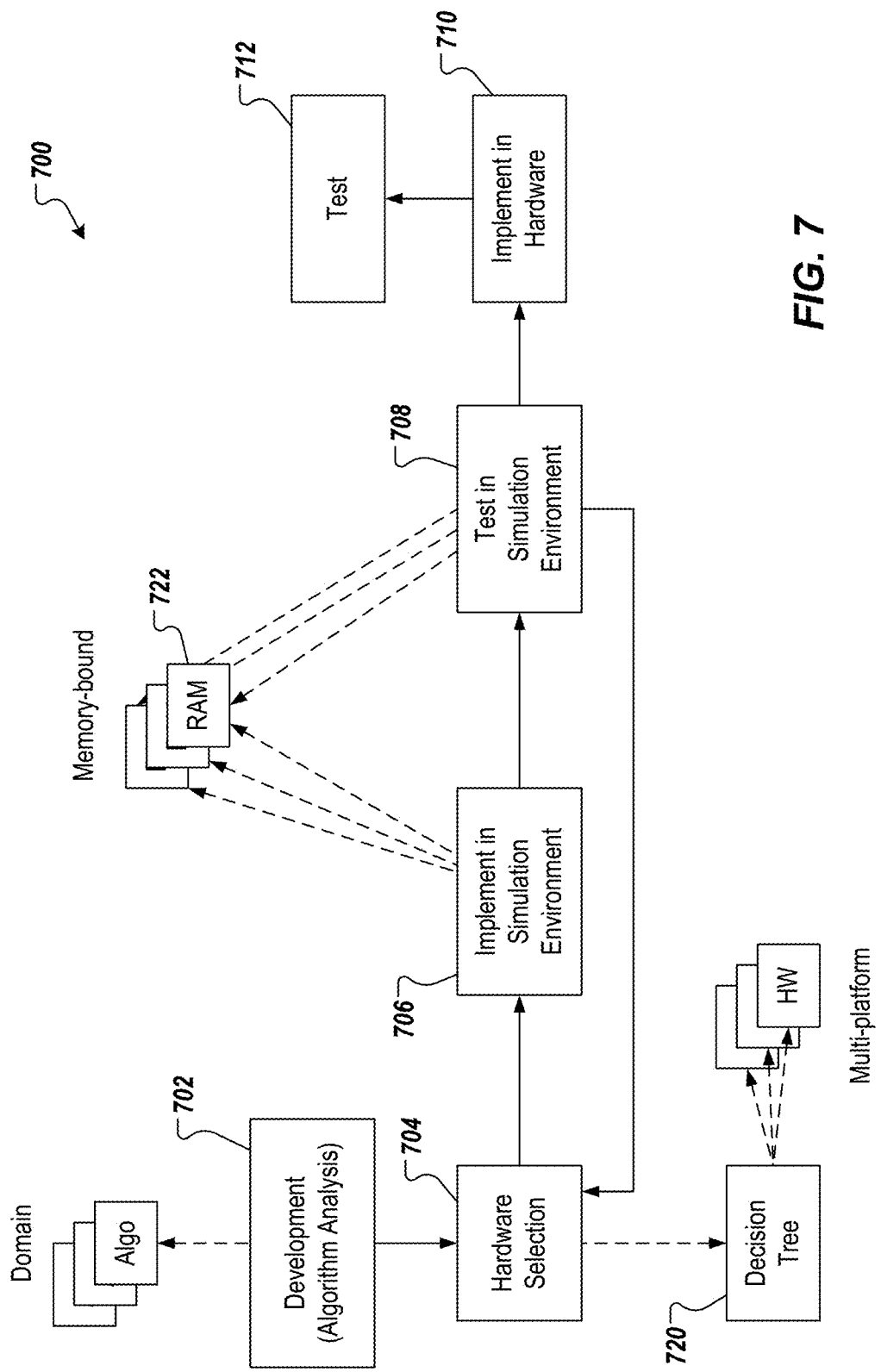
FIG. 7 depicts a representation of an example development cycle.

FIG. 7 depicts a representation of an example development cycle 700. The example development cycle 700 includes a development stage 702, a hardware selection stage 704, an implement in simulation environment stage 706, a test in simulation environment stage 708, an implement in hardware stage 710, and a test stage 712. In some examples, the development stage 702 includes the analysis of one or more algorithms for a respective domain (e.g., graph processing accelerator), which are to be executed using a hardware platform. In some examples, the hardware selection stage 704 includes selecting a hardware platform that is to be evaluated for execution of the algorithm(s). The hardware selection can be based on a decision tree 720, which can be evaluated based on a task (e.g., data access, operator, communication layer, full node) to be performed by the hardware platform, as well as characteristics and sub-characteristics of respective tasks (e.g., parallelism (little, massive), boundness (compute, communication), queries (complex, simple), memory access (regular, irregular), etc.). For example, a FPGA-based hardware platform can be selected for graph processing.

The algorithm and hardware platform are implemented (the implement in simulation environment stage 706) and tested (the test in simulation environment stage 708) in the simulation environment of the present disclosure to provide a set of results representing a performance of the hardware platform. For example, different memory configurations 722 (RAM configurations) can be tested in the simulation environment. Based on sets of evaluation results for multiple disparate hardware platforms, a hardware platform can be selected and the algorithm is implemented (the implement in hardware stage 710) and tested (the test stage (712) in the hardware platform for real-world (non-simulated) results.

As described in further detail herein, the simulation environment of the present disclosure enables the development cycle 700 as a more time- and resource-efficient development cycle than achievable in traditional approaches. For example, the simulation environment of the present disclosure provides one or more of the following example advantages: simplifies the hardware platform selection (e.g., perform in little to no time, while traditional approaches could require days to weeks), obviates a stage for understanding and selecting a memory configuration (which could take days to weeks), and obviates directly implementing and testing the selected hardware platform and memory configuration in hardware, which would take days to weeks for each combination of hardware platform and memory configuration. That is, the simulation environment of the present disclosure enables combinations of hardware platform and memory configurations to be evaluated in timespans measurable in hours instead of weeks.

Figure 8:
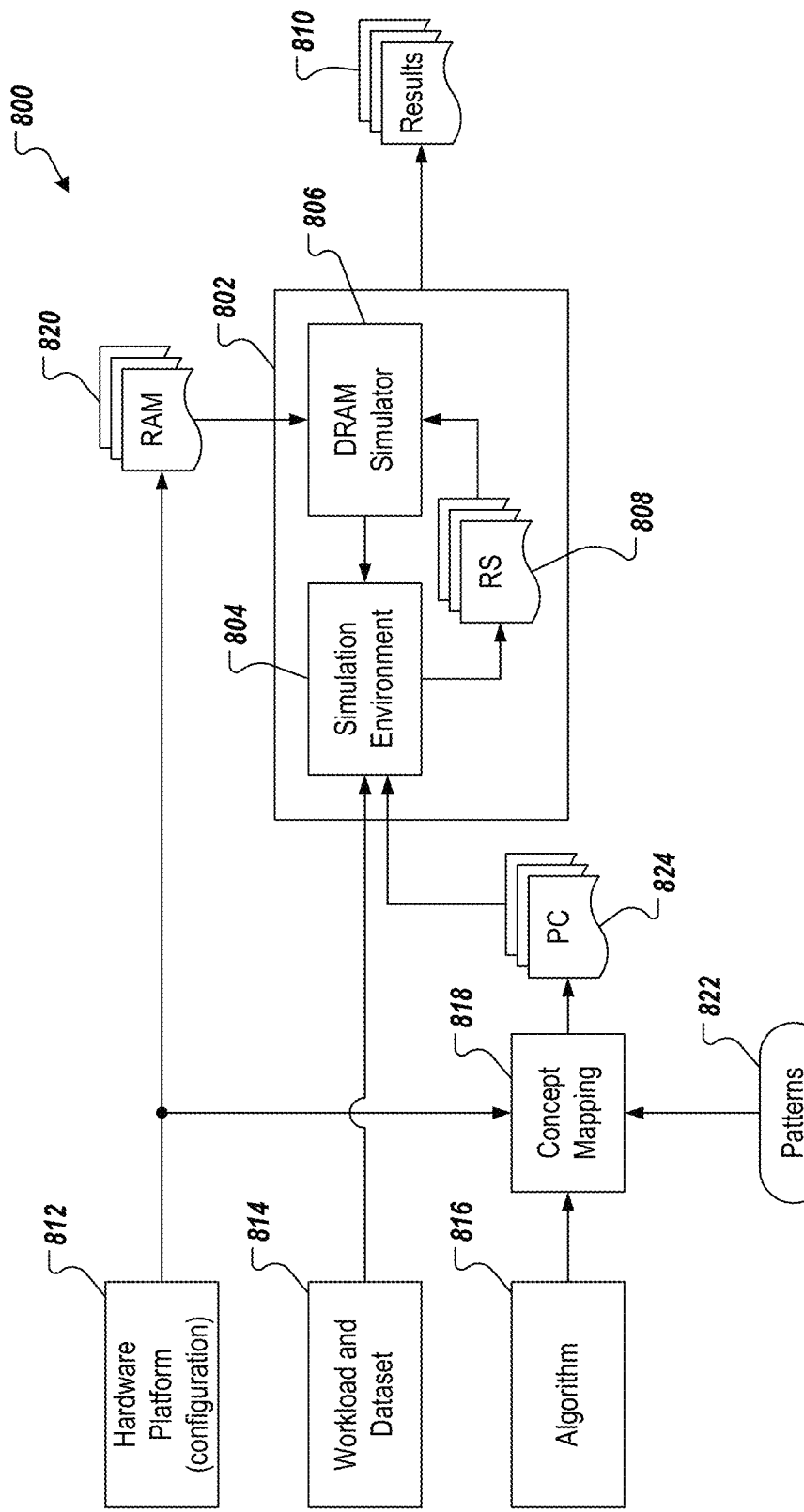
FIG. 8 depicts a conceptual representation of a system in accordance with implementations of the present disclosure.

FIG. 8 depicts a conceptual representation of a system 800 in accordance with implementations of the present disclosure. In the example of FIG. 8, the system 800 includes a simulation platform 802 that includes a simulation environment 804 (e.g., the simulation environment 300 of FIG. 3) and a DRAM simulator 806 (e.g., the DRAM simulator 320 of FIG. 3). As described in further detail herein, the simulation environment 804 generates request streams (RS) 808 that are processed by the DRAM simulator 806 to provide results 810 as output. The results 810 represent a performance of a hardware platform and memory configuration combination.

In further detail, a hardware platform configuration 812, a workload and dataset 814, and an algorithm 816 are provided. In some examples, the hardware platform configuration 812 is data representative of characteristics of a hardware platform that is to be simulated (e.g., a FPGA). In some examples, the workload and dataset 814 represents data that is to be processed during the simulation (e.g., a graph that is to be processed). In some examples, the algorithm 816 is computer-executable code that is to be executed in the simulation using the hardware platform (i.e., from the hardware platform configuration 812) and one or more memory configurations 820.

In some examples, a concept mapping module 818 is provided to map memory access patterns 822 to provide pattern compositions (PC) 824, also referred to herein as request and control flow models. More particularly, the concept mapping module 818 processes the algorithm 816 (computer-readable code) to identify data-bound components. Example data-bound components can include, without limitation, read, write, exclusive stream, parallel stream, data-dependent stream, always, cache, request reduction, and data dependency. The concept mapping module 818 maps each to a memory access abstraction to construct the request and control flow model of the algorithm 816. Example memory access abstractions, which are described in further detail herein, include, without limitation, a producer, a merger (direct, round-robin, priority), and a mapper (cache line, filter, callback). An example mapping is provided in Table 1, below.

TABLE 1

Example Mapping

| Data-bound Component | Memory Access Abstraction |
|---|---|
| Read | Producer |
| Write | |
| Exclusive Stream | Direct |
| Parallel Stream | Round-Robin |
| Data-Dependent Stream | Priority |
| Always | Cache Line |
| Cache | Filter |
| Request Reduction | |
| Data Dependency | Callback |

Figure 9:
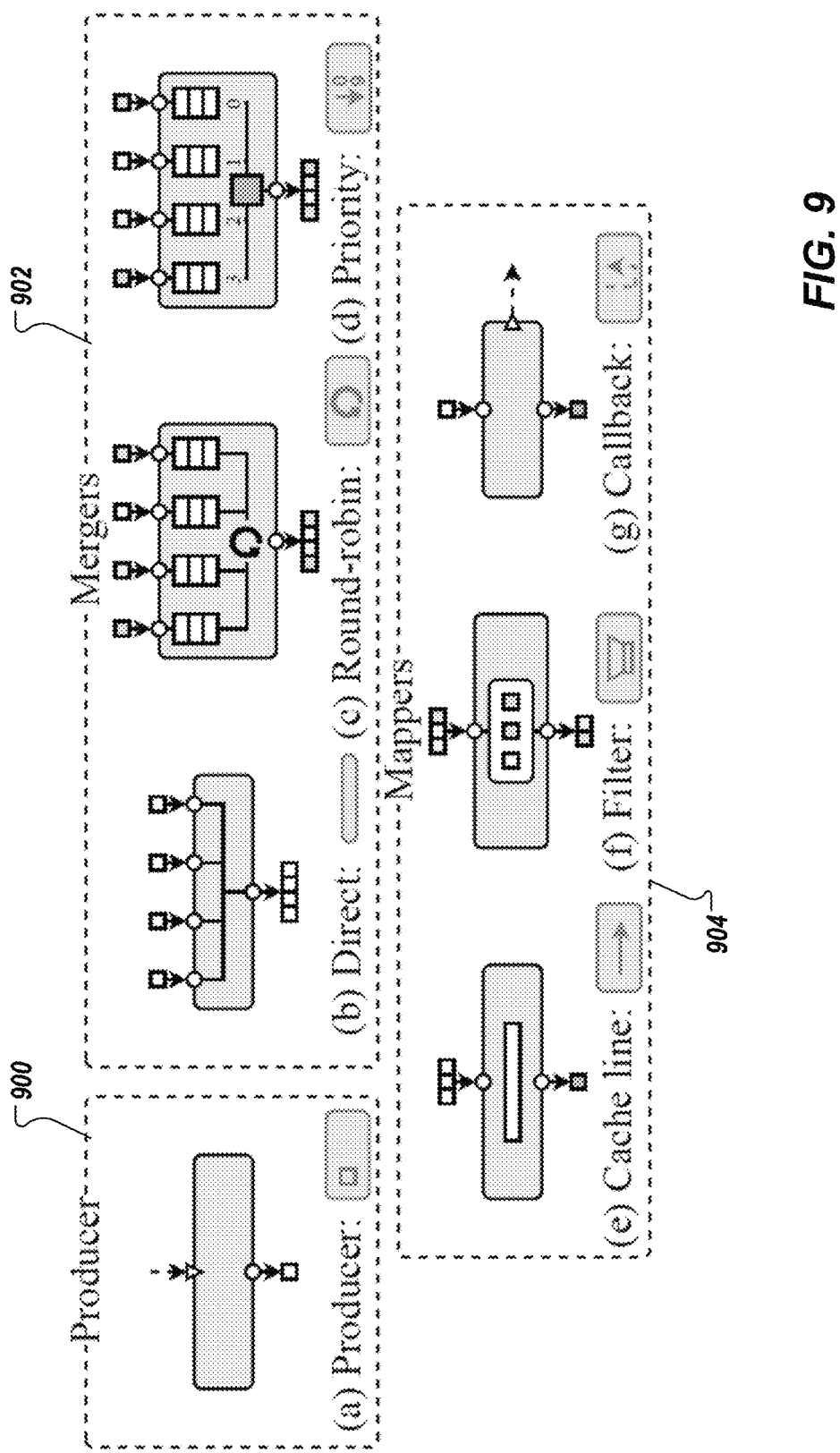
FIG. 9 depicts example memory access abstractions.

FIG. 9 depicts example memory access abstractions and respective icons grouped by role during memory access as producer 900 (producer component), merger 902 (merger component), and mapper 904 (mapper component). In some examples, at the start of each request stream, a producer 900 is used to turn control flow triggers (dashed arrow) into a request stream (solid arrow). The producer 900 might be rate limited, but if only a single producer is working at a time or requests are load balanced down-stream, the requests are just created in bulk. In some examples, multiple request streams might then be merged with a merger 902, since Ramulator only has one endpoint. Abstractions have been deduced to merge requests either directly, using round-robin, or using priority. If there are multiple request streams that do not operate in parallel, direct merging is applied. If request streams should be equally load-balanced, round-robin merging is applied. If request streams should take precedence over each other, priority merging is applied. For this, a priority is assigned to each request stream and requests are merged based on the respective priorities.

In addition to request creation with producers 900 and ordering with mergers 902, the request mappers 904 are provided. Here, implementations of the present disclosure use cache line buffers for sequential or semi-sequential accesses that merge subsequent requests to the same cache line into one request. In some examples, buffering is performed, such that multiple concurrent streams of requests independently benefit by placing the cache line buffer as far from the memory as necessary to merge the most requests. For data structures that are placed partially in on-chip memory (e.g., prefetch buffers, caches), and thus partially not require off-chip memory requests, filters are provided, which discard unnecessary requests. For control flow, a callback is provided to disregard any delays in control flow propagation and just directly enable the memory call back into the simulation. If requests are served from a cache line or filter abstraction, the callback is executed instantly.

In further detail, a producer receives a trigger that is of the form {[R, W], Byte*, Integer, Integer}. The trigger indicates a type of request (R for read, W for write), a memory address (Byte*), a count (Integer), and a width (Integer). The producer converts this input to a set of requests based on the count. For example, an example input can include {R, 0xA1, 3, 4} and the producer provides a request stream [{R, 0xA1}, {R, 0xA5}, {R, 0xA9}] as output.

In some examples, a direct merger passes through a request stream as received. For example, a request stream [{R, 0xA1}, {R, 0xA5}, {W, 0x17}] received as input is provided as the output. In some examples, a round-robin merger provides a re-ordered request stream by applying a round-robin approach to request types. For example, a request stream [{R, 0xA1}, {R, 0xA5}, {W, 0x17}] received as input is re-ordered to a request stream [{R, 0xA1}, {W, 0x17}, {R, 0xA5}] as the output. In some examples, a priority merger provides a re-ordered request stream by applying a priority based on request types (e.g., write has a higher priority than read). For example, a request stream [{R, 0xA1}, {R, 0xA5}, {W, 0x17}] received as input is re-ordered to a request stream [{W, 0x17}, {R, 0xA1}, {R, 0xA5}] as the output.

In some examples, the cache line mapper provides a reduced request stream by merging adjacent requests to the same cache line. For example, a request stream [{R, 0x00}, {R, 0x1F}, {R, 0x3F}] received as input is modified to a request stream [{R, 0x00}, {R, 0x3F}] as the output. In some examples, the filter mapper provides a reduced request stream by filtering unchanged vertex values of source vertices. For example, a request stream [{W, 0xA1, true}, {W, 0xA5, false}, {W, 0xA9, true}] received as input is modified to a request stream [{W, 0xA1}, {W, 0xA9}] as the output. Here, the Boolean value true indicates that the value of the respective source vertex has changed and the Boolean value false indicates that the value of the respective source vertex has not changed. In some examples, the callback mapper provides a modified request stream by annotating requests with callbacks, each callback returning control flow for a respective served request. For example, a request stream [{W, 0xA1}, {W, 0xA5}, {W, 0xA9}] received as input is modified to a request stream [{W, 0xA1, func(0xA1)}, {W, 0xA5, func(0xA5)}, {W, 0xA9, func(0xA9)}] as the output.

In the simulation environment of the present disclosure, and with non-limiting reference to the examples above, a graph processing simulation (e.g., in the simulation environment 300 of FIG. 3) and a Ramulator instance (e.g., the DRAM simulator 320 of FIG. 3) are instantiated and are ticked according to their respective clock frequency. For graph processing simulation, a focus is on configurability of all aspects of the simulation, such that differently parameterized performance measurements can be quickly executed. In some examples, a simulation works on multiple request streams that are merged into one and fed into the Ramulator instance. This results in a significantly reduced implementation time and complexity, relative to other approaches, provides more insight into the memory, and provides portability of ideas developed in the simulation environment.

Figure 10A:
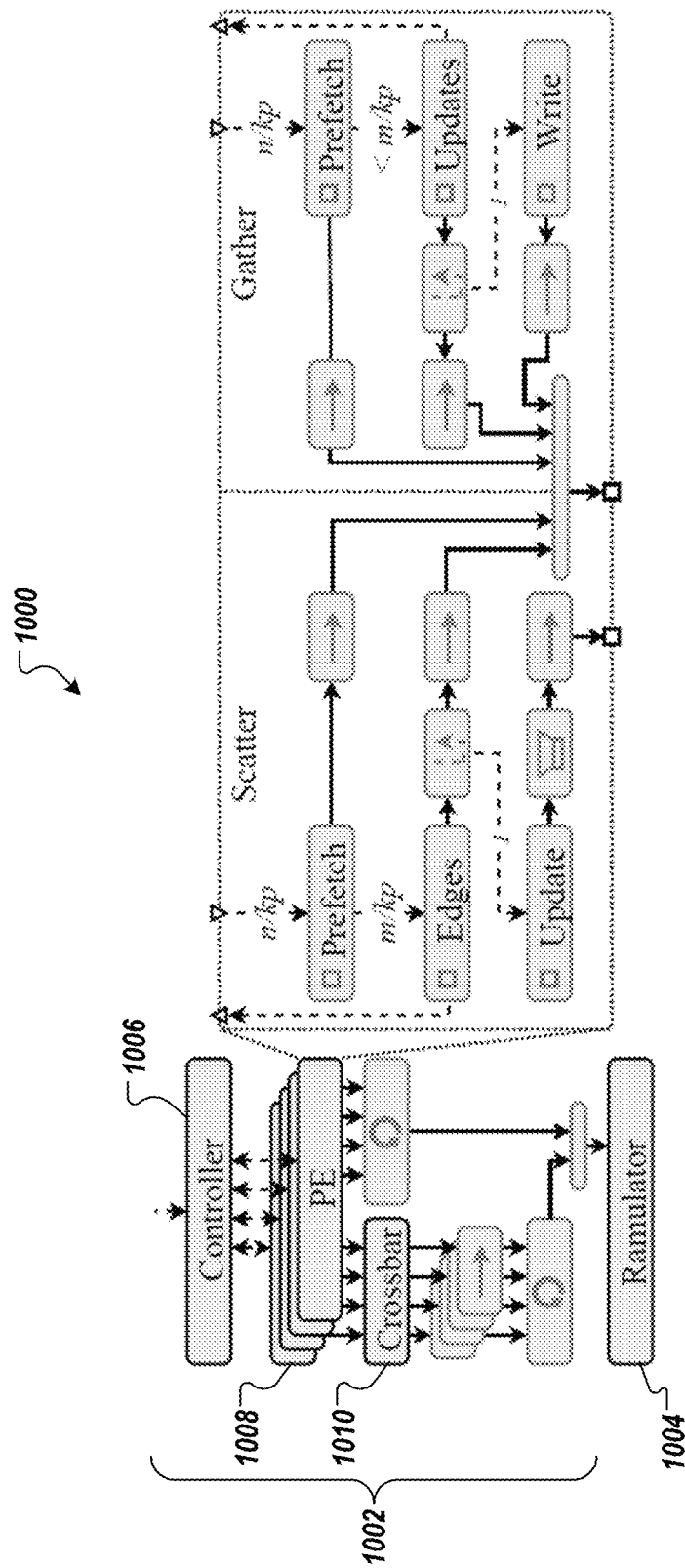
FIGS. 10A and 10B depict request and control flows for respective graph processing simulations.
Figure 10B:
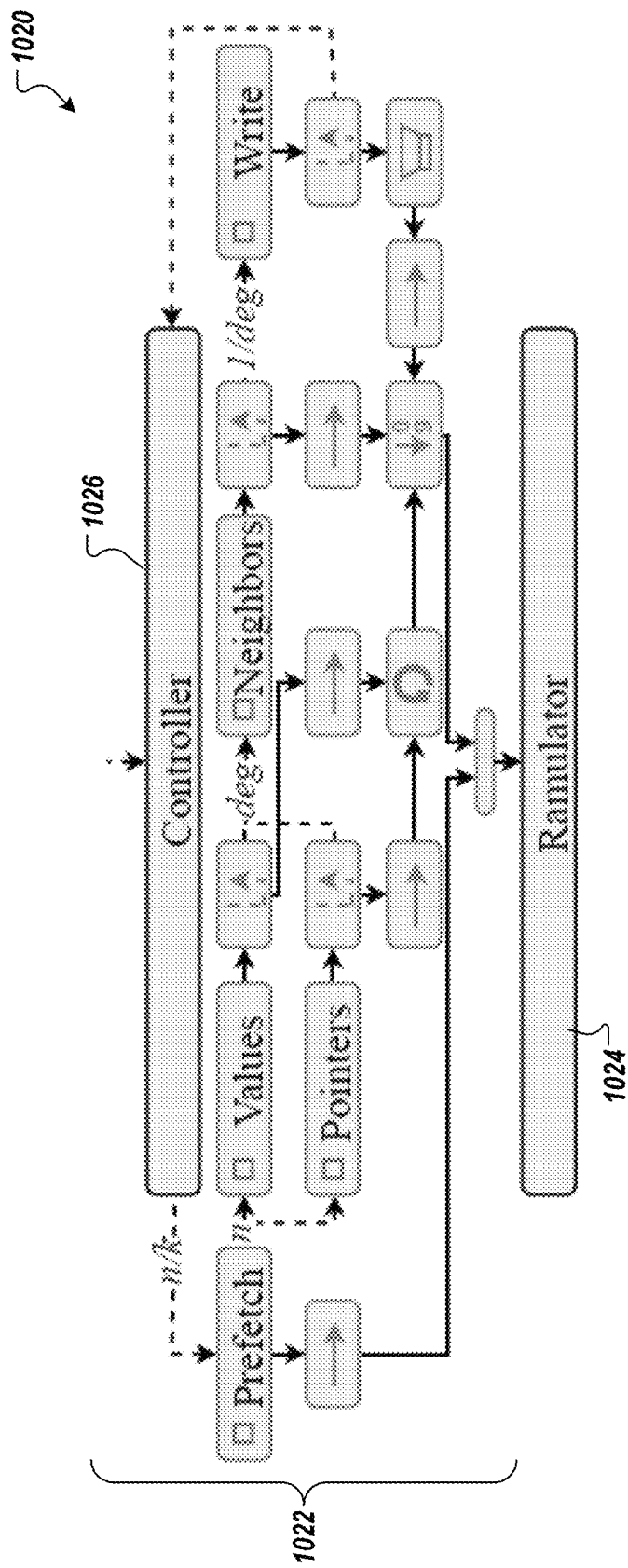

Implementations of the present disclosure will be described in further detail with reference to HitGraph and AccuGraph. FIGS. 10A and 10B depict request and control flows for graph processing simulations based on HitGraph and AccuGraph, respectively.

With regard to HitGraph, HitGraph is an edge-centric graph processing accelerator that claims to be among the best performing systems. HitGraph partitions the graph horizontally into K partitions stored as edge lists and processes the partitions in two phases in each iteration. First, updates are produced for each edge in each partition in a scatter phase. Second, all updates are applied to their respective vertex for each partition in a gather phase. A goal of this approach is to completely eliminate random reads to data and significantly reduce the amount of random writes, such that only semi-random writes remain. All reads to values of vertices are served from the prefetched partition in BRAM and all reads to either edges or updates are sequential. Writing updates is sequential, while writing values is the only semi-random memory access.

FIG. 10A depicts a request and control flow model 1000 for a HitGraph-based graph processing simulation 1002, which interacts with a DRAM simulator 1004. In the example of FIG. 10A, the DRAM simulator 1004 is provided as a Ramulator instance. Execution starts with triggering a controller 1006 (controller component) that triggers iterations of edge-centric processing until there are no changes to vertex values from the previous iteration. In each iteration, the controller 1006 first schedules all partitions for the scatter phase, before scheduling all partitions to the gather phase. Partitions are assigned beforehand to channels of the memory and a processing element (PE) 1008 is provided for each channel. After all partitions are finished in the gather phase, the next iteration is started or the accelerator (HitGraph) terminates.

The scatter phase starts by prefetching the n/K values of the current partition into BRAM. Those requests go to a cache line abstraction, such that requests to the same cache line do not result in multiple requests to the DRAM simulator 1004. After all requests are produced, the prefetch step triggers the edge reading step that reads all m/K edges of the partition. This is an average value, because the exact number of edges in a partition might vary as a result of skewed vertex degrees. For each edge request, a callback is triggered to produce an update request and merge them with a cache line abstraction. The update requests might be filtered by an optimization resulting in less than one update per edge. The target address depends on its destination vertex that can be part of any of the partitions. Accordingly, a crossbar 1010 is provided, which routes each update request to a cache line abstraction for each partition, and sequentially writes it into a partition-specific update queue. After all edges have been read, the edge reader triggers the controller 1002, which either triggers the next partition or waits on all memory requests to finish before switching phases.

The gather phase starts with prefetching the n/K vertex values sequentially. After value requests have been produced, the prefetcher triggers the update reader, which sequentially reads the update queue written by the scatter phase. For each update, a callback is registered, which triggers the value write. The value writes are not necessarily sequential, but especially for iterations where a lot of values are written, there might be a lot of locality. Thus, new values are passed through a cache line abstraction.

All request streams in each PE 1008 are merged directly into one stream without any specific merging logic, since mostly only one producer is producing requests at a time. However, edge and update reading are rate limited to the number of pipelines (e.g., 8) in each PE 1008. Because all PEs 1008 are working on independent channels and the DRAM simulator 1004 only offers one endpoint for all channels combined, a round-robin merge of the PE requests is used in order not to starve any channel. In addition, HitGraph applies optimizations to update generation. As a first step, the edges are sorted by destination vertex in each partition. This enables merging updates to the same destination vertex before writing to memory, reducing the amount of updates u from u=m to u≤n×K, and providing locality to the gather phases value writing. As a second optimization, an active bitmap with cardinality n is kept in BRAM that saves for each vertex if its value was changed in the last iteration. This enables update filtering, by filtering out updates from inactive vertices, which saves a significant amount of update writes for most algorithm and data set combinations. As another optimization, partitions with unchanged values or no updates are skipped, which saves time spent for prefetching of values and edge/update reading for some algorithms.

In some implementations, HitGraph is parameterized with the number of PEs p, pipelines q, and the partition size k. The number of PEs p is fixed to the number of memory channels, because each PE works on exactly one memory channel. The pipeline count q is limited by the bandwidth available per channel given as the cache line size divided by the edge size. The partition size is chosen such that k vertices fit into BRAM. HitGraph is able to use all available bandwidth due to fitting p and q to use all memory channels and whole cache lines of each channel per cycle. Hence, adding more compute (i.e., PEs, pipelines) would not help to solve the problem more efficiently, which is in line with the hypothesis presented herein (i.e., memory access dominates the performance).

With regard to AccuGraph, AccuGraph is a vertex-centric graph processing accelerator with pull data flow. AccuGraph partitions the graph horizontally into K partitions stored in-CSR data format and pulls updates from destination vertices. A flexible accumulator can be provided, which is able to merge many updates to vertex values per cycle.

FIG. 10B depicts a request and control flow model 1020 for an AccuGraph-based graph processing simulation 1022, which interacts with a DRAM simulator 1024. In the example of FIG. 10B, the DRAM simulator 1024 is provided as a Ramulator instance. A controller 1026 is triggered to start the execution and iterates over the graph until there are no more changes in the previous iteration. Each iteration triggers processing of all partitions. Partition processing starts with prefetching the n/K source vertex values sequentially. Thereafter, values and pointers of all destination vertices are fetched. The value requests are filtered by the values that are already present in BRAM from the partition prefetching. Pointers are fetched purely sequentially. The request streams are merged round-robin, because a value is only useful with the associated pointers. For every value fetched in this way, neighbors are read from memory sequentially. Because the neighbors of subsequent vertices are in sequence in CSR, this is fully sequential. An internal accumulator collects the changes caused through the neighbors and writes them back to memory when all neighbors were read. The value changes are also directly applied to the values currently present in BRAM for a coherent view of vertex values. This is filtered such that only values that changed are written. All of these request streams are merged by priority, with write request taking the highest priority and neighbors the second highest because otherwise the computation pipelines would be starved. Additionally, neighbors loading is rate limited to the number of edge pipelines present in the accelerator.

In some implementations, AccuGraph is parameterized by the number of vertex pipelines and the number of edge pipelines (e.g., 8 and 16, respectively) and the partition size. Similar to HitGraph's PE and pipeline fitting, the number of edge pipelines is specifically chosen to allow processing one cache line of edges per clock cycle and thus use the entire bandwidth of the memory. This is, again, in line with the hypothesis discussed herein. In some implementations a FPGA-internal data flow optimization can be provided, which enables approximation of pipeline stalls, improving simulation accuracy significantly. In some examples, the vertex cache used for the prefetched values is partitioned into 16 BRAM banks on the FPGA, which can each serve one vertex value request per clock cycle. Because there are 16 edge pipelines in a standard deployment of AccuGraph, performance deteriorates quickly, when there are stalls. Thus, stalls of this vertex cache can be implemented in the control flow between the neighbors and write producers. A neighbor's request callback is delayed until the BRAM bank can serve the value request.

Implementations of the present disclosure significantly reduce iteration time to develop and test graph processing approaches for hardware accelerators. For example, multiple enhancements can be tested using the simulation environment of the present disclosure. Here, instead of implementing and testing enhancements on the FPGA itself, which would require a relatively significant expenditure of time and technical resources to accomplish, the simulation environment of the present disclosure enables relatively quick implementations and assessment of enhancements for multiple, disparate data sets and/or DRAM types. This not only reduces the overall engineering time by a form of rapid graph accelerator prototyping, but also reduces expenditure of resources to conduct such assessment.

Example enhancements are described in further detail herein in the context of AccuGraph. It is contemplated, however, that implementations of the present disclosure can be used to implement assess enhancements with any appropriate graph processing accelerator (e.g., HitGraph). As discussed herein, AccuGraph writes all value changes through to off-chip memory and also applies the changes to BRAM, if the changes are in the current partition. Thus, the simulation reveals that BRAM and off-chip memory are always in sync. Nevertheless, at the beginning of processing a partition, the value set is prefetched even if the values are already present in BRAM. In view of this, a first example optimization can include prefetch skipping. As another example, a simulation can reveal effectiveness of partition skipping with another graph processing accelerator (e.g., HitGraph). Consequently, a second example optimization can include adding partition skipping to AccuGraph. Both of the example optimizations can easily be added to the control flow of the AccuGraph simulation by directly triggering the value and pointer reading producers or completely skipping triggering of execution for certain partitions, respectively. For prefetch skipping, the currently fetched partition can be compared to the next partition to prefetch and skip prefetching, if they are the same. For partition skipping, values of vertices can be tracked to determine changes, and if any value of the vertices of a partition are not changed, the partition can be skipped.

To prove the effectiveness of either or both of the example optimizations, the effect of optimizations for BFS and WCC (separately and combined) can be evaluated through simulations using the simulation environment of the present disclosure. Such evaluations reveal that, for all small graphs with only one partition, an improvement based on prefetch skipping is seen (partition skipping is not applicable to such graphs). For other graphs, an improvement based on partition skipping is seen. In some instances, prefetch skipping contributes a small improvement, but only when combined with partition skipping. Overall, the evaluations reveal no decrease in performance, suggesting that both optimizations should always be applied.

It can be noted that these insights on the example optimizations were possible using the simulation environment of the present disclosure in a relatively short amount of time and small expenditure of resources. This is as compared to engineering on an actual FPGA. As discussed herein, developing and verifying a complicated FPGA design typically takes weeks, while the implementation of a new graph accelerator approach in the simulation environment takes days or even just hours, if the approach is well understood. Additionally, the iteration time is significantly improved. Synthesis runs for compiling hardware description code to FPGA take hours up to a day without many possibilities of incremental synthesis. In contrast, a complete compilation of the simulation environment takes a fraction of the time (e.g., 33.5 seconds on a server) with the possibility of easily utilizing parameters and incremental compilation. Consequently, significant improvements in reducing technical resources (e.g., processing power, bandwidth, memory) are achieved by the simulation environment. Further, the simulation environment of the present disclosure does not limit users to special hardware that is only available in limited numbers (FPGAs). Many simulation runs can be executed in parallel on one or even multiple servers.

As described herein, implementations of the present disclosure provide a simulation environment for simulating graph processing accelerators (e.g., HitGraph, AccuGraph) on the hypothesis: memory access patterns dominate the overall runtime of graph processing such that disregarding the internal data flow results in a reasonable error in a simulation. The simulation environment of the present disclosure models request flows that are fed into a DRAM simulator (e.g., Ramulator) and control flow based on data dependencies. Implementations of the present disclosure further provide a set of memory access abstractions (discussed herein with reference to FIG. 11) that are applied in the graph processing simulations. Even though the simulation environment of the present disclosure executes a graph processing simulation that disregard large parts of the graph processing accelerator (e.g., HitGraph, AccuGraph), the simulation environment has been shown to reproduce groundtruth measurements within a reasonable error for most workloads. As described herein, the simulation environment of the present disclosure significantly reduces iteration time to develop and test graph processing approaches for hardware accelerators and enables deeper inspection with DRAM statistics as well as easy parameter variation without a fixed hardware platform.

Figure 11:
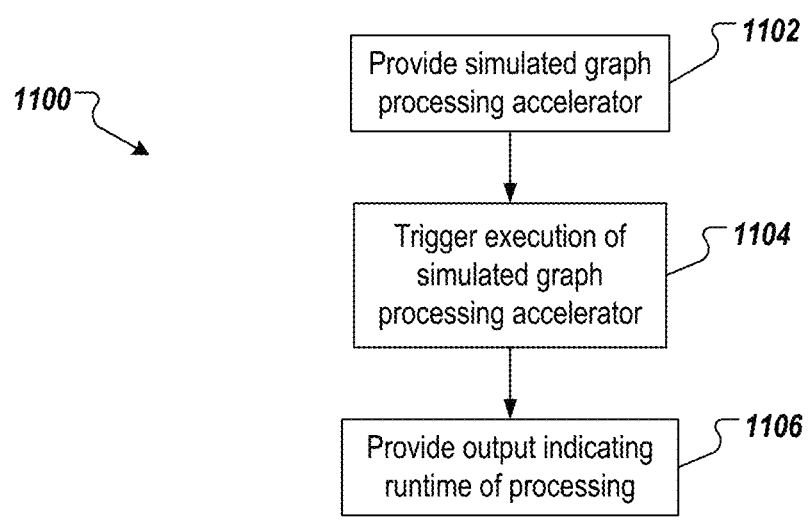
FIG. 11 depicts an example process that can be executed in accordance with implementations of the present disclosure.
Figure 12:
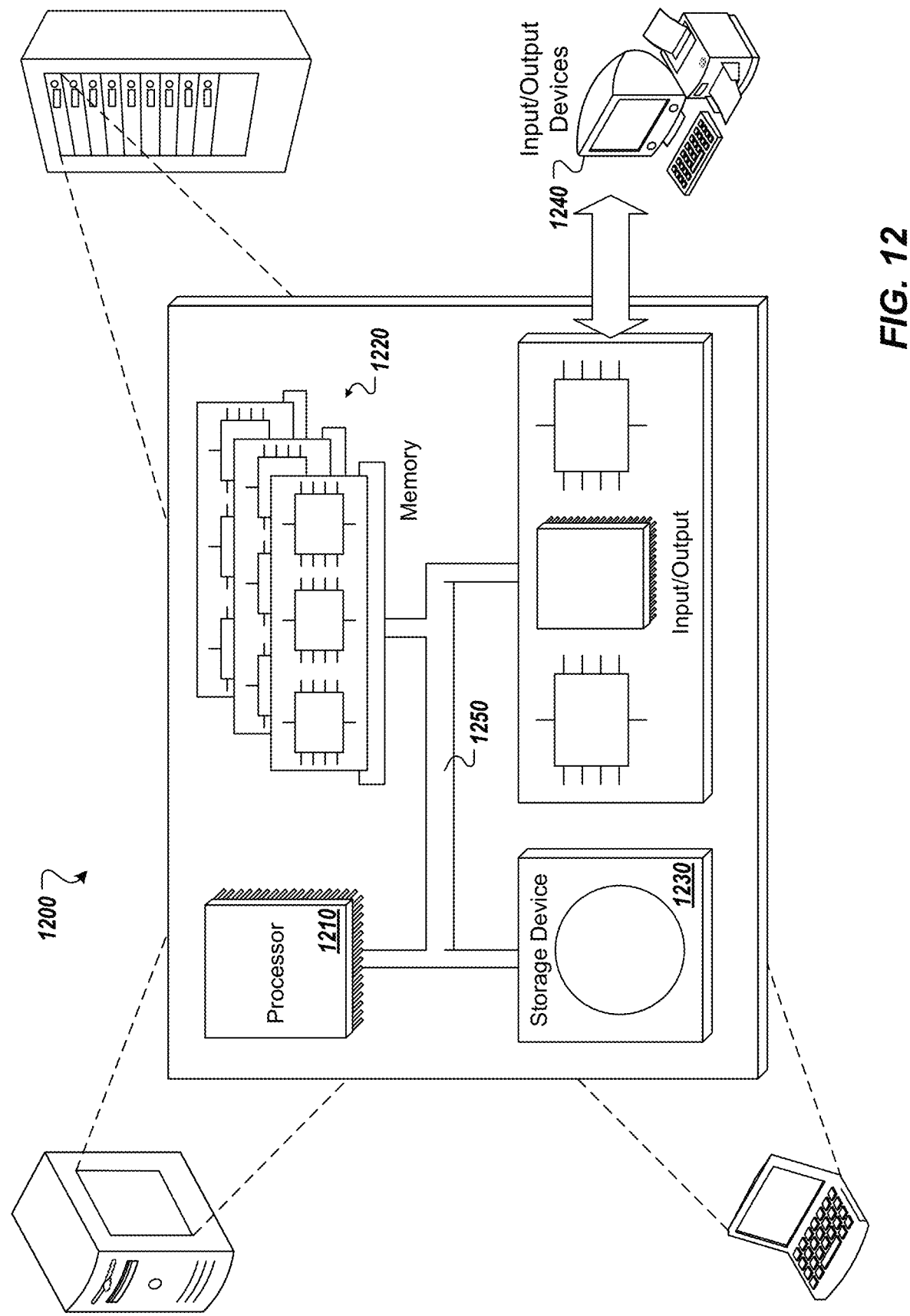
FIG. 12 is a schematic illustration of example computer systems that can be used to execute implementations of the present disclosure.

FIG. 11 depicts an example process that can be executed in accordance with implementations of the present disclosure. In some examples, the example process 900 is provided using one or more computer-executable programs executed by one or more computing devices. The process 900 can be executed to simulate performance of combinations of graph processing accelerators and memory configurations.

A simulated graph processing accelerator is provided (902). For example, and as described herein, the simulated graph processing accelerator represents a hardware-based graph processing accelerator. In some examples, the simulated graph processing accelerator includes a controller component, a set of producer components, and a final merge component. In some examples, the controller component is configured to trigger iterations of processing of a graph that includes a set of vertices and a set of edges. In some examples, the controller component selectively ceases processing of the graph. In some examples, each producer component is configured to, for each iteration, turn control flow triggers into a request stream that includes a set of requests to memory. In some examples, the final merge component is configured to directly merge request streams of producer components.

Execution of the simulated graph processing accelerator is triggered (904). In some examples, execution is triggered as a simulation of processing of a graph for one of BFS, SSSP, WCC, SpMV, and PR. In some examples, and as described herein, execution includes generating request streams from each producer component, merging request streams using the final merge component to provide a merged request stream, inputting the merged request stream to a memory simulator, and processing, by the memory simulator, the merged request stream to simulate handling of requests in memory.

In some examples, and as described herein, the simulation includes edge-centric graph processing of the graph. Here, for example, the controller component is further configured to execute iterations of the edge-centric graph processing until there are no changes to vertex values from a previous iteration, and to, for each iteration, schedule all partitions for a scatter phase of the edge-centric graph processing before scheduling all partitions to a gather phase of the edge-centric graph processing. In some examples, and as described herein, the simulation comprises vertex-centric graph processing of the graph.

Output indicating runtime of processing of the graph is provided (906). In some examples, the output is provided in response to ceasing execution of the simulated graph processing accelerator. Example output can include, without limitation, a number of memory requests (e.g., down to granularity of per memory bank), latency of memory requests, row hits, row misses, row conflicts, number of edges read, number of edges written, number of vertices read, number of vertices written, and idle cycles of the graph processing accelerator.

Referring now to FIG. 10, a schematic diagram of an example computing system 1000 is provided. The system 1000 can be used for the operations described in association with the implementations described herein. For example, the system 1000 may be included in any or all of the server components discussed herein. The system 1000 includes a processor 1010, a memory 1020, a storage device 1030, and an input/output device 1040. The components 1010, 1020, 1030, 1040 are interconnected using a system bus 1050. The processor 1010 is capable of processing instructions for execution within the system 1000. In some implementations, the processor 1010 is a single-threaded processor. In some implementations, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In some implementations, the memory 1020 is a computer-readable medium. In some implementations, the memory 1020 is a volatile memory unit. In some implementations, the memory 1020 is a non-volatile memory unit. The storage device 1030 is capable of providing mass storage for the system 1000. In some implementations, the storage device 1030 is a computer-readable medium. In some implementations, the storage device 1030 may be a floppy disk device, a hard disk device (e.g., solid state drives (SSDs)), an optical disk device, or a tape device. The input/output device 1040 provides input/output operations for the system 1000. In some implementations, the input/output device 1040 includes a keyboard and/or pointing device. In some implementations, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for simulating performance of combinations of graph processing accelerators and memory configurations, the method being executed by one or more processors and comprising:
   providing a first simulated graph processing accelerator representative of a hardware-based graph processing accelerator, the first simulated graph processing accelerator comprising:
      a controller component that is configured to trigger iterations of processing of a graph comprising a set of vertices and a set of edges and selectively cease processing of the graph,
      a set of producer components, each producer component configured to, for each iteration, turn control flow triggers into a request stream comprising a set of requests to memory, and
      a final merge component that is configured to directly merge request streams of producer components;
   triggering execution of the first simulated graph processing accelerator as a simulation of processing of a graph for one or more of breadth-first search (BF S), single source shortest path (SSSP), weakly connected components (WCC), sparse matrix-vector multiplication (SpMV), and PageRank (PR), execution comprising:
      generating request streams from each producer component,
      merging request streams using the final merge component to provide a merged request stream,
      inputting the merged request stream to a memory simulator, and
      processing, by the memory simulator, the merged request stream to simulate handling of requests in memory; and
   providing, in response to ceasing execution of the first simulated graph processing accelerator, output comprising a runtime for processing of the graph by the first simulated graph processing accelerator.

2. The method of claim 1, wherein the simulation comprises edge-centric graph processing of the graph.

3. The method of claim 2, wherein the controller component is further configured to execute iterations of the edge-centric graph processing until there are no changes to vertex values from a previous iteration, and to, for each iteration, schedule all partitions for a scatter phase of the edge-centric graph processing before scheduling all partitions to a gather phase of the edge-centric graph processing.

4. The method of claim 1, wherein the simulation comprises vertex-centric graph processing of the graph.

5. The method of claim 1, further comprising:
   providing a second simulated graph processing accelerator representative of one or more optimizations applied to the hardware-based graph processing accelerator; and
   triggering execution of the first simulated graph processing accelerator as a simulation of processing of a graph.

6. The method of claim 1, wherein the set of requests comprises read requests and write requests.

7. The method of claim 1, wherein the memory simulator comprises a computer-executable program that simulates dynamic random access memory (DRAM).

8. A non-transitory computer-readable storage medium coupled to one or more processors and having instructions stored thereon which, when executed by the one or more processors, cause the one or more processors to perform operations for simulating performance of combinations of graph processing accelerators and memory configurations, the operations comprising:
   providing a first simulated graph processing accelerator representative of a hardware-based graph processing accelerator, the first simulated graph processing accelerator comprising:
      a controller component that is configured to trigger iterations of processing of a graph comprising a set of vertices and a set of edges and selectively cease processing of the graph,
      a set of producer components, each producer component configured to, for each iteration, turn control flow triggers into a request stream comprising a set of requests to memory, and
      a final merge component that is configured to directly merge request streams of producer components;
   triggering execution of the first simulated graph processing accelerator as a simulation of processing of a graph for one or more of breadth-first search (BF S), single source shortest path (SSSP), weakly connected components (WCC), sparse matrix-vector multiplication (SpMV), and PageRank (PR), execution comprising:
      generating request streams from each producer component,
      merging request streams using the final merge component to provide a merged request stream,
      inputting the merged request stream to a memory simulator, and
      processing, by the memory simulator, the merged request stream to simulate handling of requests in memory; and
   providing, in response to ceasing execution of the first simulated graph processing accelerator, output comprising a runtime for processing of the graph by the first simulated graph processing accelerator.

9. The non-transitory computer-readable storage medium of claim 8, wherein the simulation comprises edge-centric graph processing of the graph.

10. The non-transitory computer-readable storage medium of claim 9, wherein the controller component is further configured to execute iterations of the edge-centric graph processing until there are no changes to vertex values from a previous iteration, and to, for each iteration, schedule all partitions for a scatter phase of the edge-centric graph processing before scheduling all partitions to a gather phase of the edge-centric graph processing.

11. The non-transitory computer-readable storage medium of claim 8, wherein the simulation comprises vertex-centric graph processing of the graph.

12. The non-transitory computer-readable storage medium of claim 8, wherein operations further comprise:
providing a second simulated graph processing accelerator representative of one or more optimizations applied to the hardware-based graph processing accelerator; and
triggering execution of the first simulated graph processing accelerator as a simulation of processing of a graph.

13. The non-transitory computer-readable storage medium of claim 8, wherein the set of requests comprises read requests and write requests.

14. The non-transitory computer-readable storage medium of claim 8, wherein the memory simulator comprises a computer-executable program that simulates dynamic random access memory (DRAM).

15. A system, comprising:
a computing device; and
a computer-readable storage device coupled to the computing device and having instructions stored thereon which, when executed by the computing device, cause the computing device to perform operations for simulating performance of combinations of graph processing accelerators and memory configurations, the operations comprising:
providing a first simulated graph processing accelerator representative of a hardware-based graph processing accelerator, the first simulated graph processing accelerator comprising:
a controller component that is configured to trigger iterations of processing of a graph comprising a set of vertices and a set of edges and selectively cease processing of the graph,
a set of producer components, each producer component configured to, for each iteration, turn control flow triggers into a request stream comprising a set of requests to memory, and
a final merge component that is configured to directly merge request streams of producer components;
triggering execution of the first simulated graph processing accelerator as a simulation of processing of a graph for one or more of breadth-first search (BFS), single source shortest path (SSSP), weakly connected components (WCC), sparse matrix-vector multiplication (SpMV), and PageRank (PR), execution comprising:
generating request streams from each producer component,
merging request streams using the final merge component to provide a merged request stream,
inputting the merged request stream to a memory simulator, and
processing, by the memory simulator, the merged request stream to simulate handling of requests in memory; and
providing, in response to ceasing execution of the first simulated graph processing accelerator, output comprising a runtime for processing of the graph by the first simulated graph processing accelerator.

16. The system of claim 15, wherein the simulation comprises edge-centric graph processing of the graph.

17. The system of claim 16, wherein the controller component is further configured to execute iterations of the edge-centric graph processing until there are no changes to vertex values from a previous iteration, and to, for each iteration, schedule all partitions for a scatter phase of the edge-centric graph processing before scheduling all partitions to a gather phase of the edge-centric graph processing.

18. The system of claim 15, wherein the simulation comprises vertex-centric graph processing of the graph.

19. The system of claim 15, wherein operations further comprise:
providing a second simulated graph processing accelerator representative of one or more optimizations applied to the hardware-based graph processing accelerator; and
triggering execution of the first simulated graph processing accelerator as a simulation of processing of a graph.

20. The system of claim 15, wherein the set of requests comprises read requests and write requests.

* * * * *